US009937860B1

(12) United States Patent
Moradi-Pari et al.

(10) Patent No.: US 9,937,860 B1
(45) Date of Patent: Apr. 10, 2018

(54) METHOD FOR DETECTING FORWARD COLLISION

(71) Applicants: Hyundai America Technical Center, Inc., Superior Township, MI (US); HYUNDAI MOTOR COMPANY, Seoul (KR); KIA MOTORS CORPORATION, Seoul (KR)

(72) Inventors: Ehsan Moradi-Pari, West Bloomfield, MI (US); Mohammad Naserian, Windsor (CA); Mohammad Horani, Troy, MI (US); Allan Lewis, Windsor (CA); John Robb, Oxford, MI (US)

(73) Assignees: HYUNDAI AMERICA TECHNICAL CENTER, INC., Superior Township, MI (US); HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/275,571

(22) Filed: Sep. 26, 2016

(51) Int. Cl.
*B60Q 1/00* (2006.01)
*B60Q 9/00* (2006.01)

(52) U.S. Cl.
CPC ................... *B60Q 9/008* (2013.01)

(58) Field of Classification Search
CPC  G08G 1/22; B60W 2050/0078; B60W 30/16; B60W 40/06; B60W 50/14; B60W 2050/046; B60W 2550/306; B60W 30/095; B60W 2550/30; B60W 30/08; B60W 30/09; G01S 13/931; G01S 2013/9353; G01S 2013/9375; G01S 2013/9378; G01S 17/936; G01S 2205/002; G01C 21/26; G01C 21/30; G01C 21/3697; G01C 21/28; B60R 21/0134; G06K 9/00805
(Continued)

(56) References Cited

U.S. PATENT DOCUMENTS 7,295,925 B2 * 11/2007 Breed ................. B60N 2/2863
340/436
7,647,178 B2    1/2010  Ekmark et al.
(Continued)

FOREIGN PATENT DOCUMENTS

KR    10-2009-0078977    7/2009
KR    10-2012-0024230    3/2012

*Primary Examiner* — Emily C Terrell
(74) *Attorney, Agent, or Firm* — Brinks Gilson & Lione

(57) ABSTRACT

A safety system for an automotive vehicle includes: a dedicated radio to receive and transmit state data between a host vehicle and a remote vehicle; a global positioning system (GPS) receiver; an on-board unit (OBE) to perform a vehicle-to-vehicle (V2V) communications so that the host vehicle receives state data of the remove vehicle in a basic safety message (BSM) format; and a safety control unit. In particular, the safety control unit receives the state data of the host and remote vehicles, calculates a separation distance, a prediction horizon time, and then compares the prediction horizon time with a driver reaction time to generate a warning to a driver. More specifically, the safety control unit performs a cost value procedure when a deducted prediction horizon time is greater than zero to determine variable coefficients for estimating a future position and speed of the host and remote vehicles.

7 Claims, 4 Drawing Sheets

(58) Field of Classification Search
USPC .................................................. 340/435, 436
See application file for complete search history.

(56) References Cited

U.S. PATENT DOCUMENTS

| | | | |
|---|---|---|---|
| 8,352,112 B2* | 1/2013 | Mudalige | G08G 1/163 |
| | | | 340/435 |
| 8,527,172 B2 | 9/2013 | Moshchuk et al. | |
| 8,577,552 B1 | 11/2013 | Smit | |
| 8,577,592 B2 | 11/2013 | Chatterjee et al. | |
| 2002/0087251 A1 | 7/2002 | Kogure et al. | |
| 2008/0133136 A1* | 6/2008 | Breed | B60N 2/2863 |
| | | | 701/301 |
| 2010/0169009 A1* | 7/2010 | Breed | B60N 2/2863 |
| | | | 701/301 |
| 2014/0002657 A1 | 1/2014 | Kim et al. | |
| 2014/0070980 A1 | 3/2014 | Park | |
| 2014/0306826 A1* | 10/2014 | Ricci | H04W 48/04 |
| | | | 340/573.1 |
| 2017/0120906 A1* | 5/2017 | Penilla | B60W 30/09 |

* cited by examiner

METHOD FOR DETECTING FORWARD COLLISION

FIELD

The present disclosure relates to a method and system for a vehicle to predict collision situations of the vehicle in advance and for warning a driver.

BACKGROUND

The statements in this section merely provide background information related to the present disclosure and may not constitute prior art.

The auto-industry has strived for developing various technologies and systems to provide a driver with safe and comfortable driving environment. Already many cars have instruments that use radar or ultrasound to detect obstacles or vehicles. For example, a photographing unit installed at a front of a vehicle takes an image of an object in a forward direction of the vehicle and the taken images are processed to decide any impending collision situation and to warn a driver. However, this application is limited to a range where the photographing unit can take an image and no other obstacle (e.g., a surrounding car) exists between a target object and the unit. Cars equipped with various sensors and radar to collection surrounding information have similar difficulties due to their limited range of a few car lengths.

SUMMARY

The present disclosure provides a method and a system for a vehicle to detect and avoid forward collision by using data received from a remote vehicle via a vehicle-to-vehicle (V2V) communications so that a host vehicle state of the remote vehicle and sends a warning to a driver of the host vehicle. This method improves the safety of the driving by providing the warning in advance through predicted state of the remote vehicle so that the driver is given more time to properly react to avoid an impending collision.

The present disclosure provides a safety system for an automotive vehicle, and the system includes: a dedicated short range communication (DSRC) radio configured to receive and transmit state data between a host vehicle and a remote vehicle; a global positioning system (GPS) receiver configured to receive a position of the host vehicle and transmit the location to the DSCR unit; an on-board unit (OBE) contained the DSRC radio and configured to perform a vehicle-to-vehicle (V2V) communications so that the host vehicle receives state data of the remove vehicle in a basic safety message (BSM) format; a safety control unit.

The safety control unit is configured to: receive the state data of the host and remote vehicles, the state data including a position, a speed and a heading of the host and remote vehicles; calculate a separation distance between the host and remote vehicles based on the positions of the remote and host vehicles; calculate a prediction horizon time based on the separation distance and the speed of the current and remote vehicles; compare the prediction horizon time with a driver reaction time; generate a warning to a driver of the host vehicle when the prediction horizon time is equal to or less than the driver reaction time.

The safety control unit further deducts the driver reaction time from the prediction horizon time when the prediction time is greater than the driver reaction time, and performs a cost value procedure when the deducted prediction horizon time is greater than zero (0). In particular, the cost value procedure optimizes a function for a parameter, and in one form is to determine coefficients of linear prediction, e.g for the position and speed of the host and remote vehicles and also to cost the separation distance. After the cost value procedure, the safety control unit may calculate a stopping distance between the host and remote vehicles based on a configurable deceleration rate of the host vehicle and a friction coefficient of a road surface on which the host vehicle runs, increase a warning count when the stopping distance is equal to or greater than the separate distance, and generate a warning to the driver when a number of the warning account is greater than a predetermined warning threshold.

The method and system of the present disclosure enable a driver to avoid a collision with a remote vehicle by providing a warning of the collision to the driver. For example, the system may detect a rear end collision with a remote vehicle running in front of a host vehicle when the remote vehicle decelerates.

In one form, the safety control unit receives the state data of the host vehicle via an internal communication network of the host vehicle.

The cost value procedure may perform costing the position and speed of the remote vehicle based on a predicted acceleration of the remote vehicle, and also carry out costing of the position and speed of the host vehicle based on a current acceleration of the host vehicle.

In particular, the predicted acceleration of the remote vehicle is calculated as:

$$RV_{Accel}(t+T) = a_1 RV_{Accel}(t) + a_2 RV_{Accel}(t-T) + \ldots + a_n RV_{Accel}(t-(n-1)T)$$

where: $RV_{Accel}(t+T)$ is a predicted acceleration of the remote vehicle (RV) at time t+T, $RV_{Accel}(t)$ is an acceleration of RV at time t, T is a sampling time of the BSM (e.g., 0.1 second), $a_1, a_2, \ldots, a_n$ are coefficients of linear prediction, and n indicates a degree of the linear prediction model.

In another form, the safety control unit may cost the separation distance based on the predicted acceleration of the remote vehicle, and the current acceleration of the host vehicle.

The present disclosure also provides a method for detecting forward collision of an automotive vehicle including a dedicated short range communication (DSRC) radio equipped with an on-board unit (OBE).

The method includes the steps of: extracting, by a safety control unit of a host vehicle, a position, a speed and a heading of a remote vehicle from a basic safety message (BSM) received from a remote vehicle via a vehicle-to-vehicle (V2V) communication; receiving a speed, a position and a heading of the host vehicle via an internal communication network of the host vehicle; calculating, by the safety control unit, a separation distance between the host and remote vehicles based on the positions of the remote and host vehicles; calculating, by the safety control unit, a prediction horizon time based on the separation distance and the speed of the current and remote vehicles.

After the calculation, the safety control unit compares the prediction horizon time with a driver reaction time, and generates a warning to a driver of the host vehicle when the prediction horizon time is equal to or less than the driver reaction time.

When the prediction time is greater than the driver reaction time, the safety control unit deducts the driver reaction time from the prediction horizon time, performs a cost value procedure when the deducted prediction horizon time is greater than zero "0."

The cost value procedure is configured to cost the position and speed of the host and remote vehicles and to cost the separation distance. After the cost value procedure, the safety control unit calculates a stopping distance between the host and remote vehicles based on a configurable deceleration rate of the host vehicle and a friction coefficient of a road surface on which the host vehicle runs, and increases a warning count when the stopping distance is equal to or greater than the separate distance so as to generate a warning to the driver when a number of the warning account is greater than a predetermined warning threshold.

In another form, the cost value procedure may cost the position and speed of the remote vehicle based on a predicted acceleration of the remote vehicle, and may cost the position and speed of the host vehicle based on a current acceleration of the host vehicle.

In particular, the predicted acceleration of the remote vehicle may be calculated as:

$$RV_{Accel}(t+T)=a_1 RV_{Accel}(t)+a_2 RV_{Accel}(t-T)+ \ldots +a_n RV_{Accel}(t-(n-1)T)$$

where: $RV_{Accel}(t+T)$ is a predicted acceleration of the remote vehicle (RV) at time t+T, $RV_{Accel}(t)$ is an acceleration of the RV at time t, T is a sampling time of the BSM (e.g., 0.1 second), $a_1, a_2, \ldots, a_n$ are coefficients of linear prediction, and n indicates a degree of the linear prediction model.

In addition, the safety control unit may determine a correction factor among predetermined correction factors (e.g., Correction Factors from 1 to 5) based on at least one of a wiper status or an ambient temperature of the host vehicle, and may apply the determined correction factor to a predetermined friction value so as to set up the friction coefficient of the road surface.

In still another form, the safety control unit may determine the correction factor by a method including the steps of: receiving the wiper status and ambient temperature of the host vehicle via the internal communication network thereof; determining whether the ambient temperature is less than a predetermined first threshold when the wiper status is off; setting up the predetermined friction value as the friction coefficient of the road surface when the ambient temperature is equal to or greater than the predetermined first threshold; determining whether the ambient temperature is less a predetermined second threshold when the ambient temperature is less than the predetermined first threshold; applying a first correction factor when the ambient temperature is equal to or greater than the predetermined second threshold; applying a second correction factor when the ambient temperature is less than the predetermined second threshold.

In other form, the safety control unit may determine the correction factor by the steps of: determining whether the wiper status is on; determining whether the ambient temperature is less a predetermined first threshold when the wiper status is on; applying a third correction factor when the ambient temperature is equal to or greater than the predetermined first threshold; applying a fourth correction factor when the ambient temperature is less than the predetermined first threshold and equal to or greater than a predetermined second threshold; applying a fifth correction factor when the ambient temperature is less than the predetermined second threshold.

The method of the present disclosure uses the configurable deceleration rate of the host vehicle which is predetermined based on a brake system of the host vehicle, and the stopping distance is calculated as:

$$d_s = \frac{(HVP_{Velocity})^2}{-2 \times rqd_{decel}} - \frac{(RVP_{Velocity})^2}{-2 \times RV_{Accel}}$$

where: $rqd_{decel}$ is calculated as: $rqd_{decel} = \mu \times rqd_{decel}$,
$HVP_{Velocity}$ is calculated as: $HV_{Velocity} + HV_{Accel} \times t_r$,
$RVP_{Velocity}$ is calculated as: $RV_{Velocity} + RV_{Accel} \times t_r$,
where; $d_s$ is the stopping distance, $\mu$ is the friction coefficient of the road surface,
$rqd_{decel}$ is the configurable deceleration rate of the host vehicle (HV),
$HV_{Velocity}$ is the velocity of the HV, $HV_{Accel}$ is the acceleration rate of the HV,
$t_r$ is the driver's reaction time, $RV_{velocity}$ is the velocity of the remote vehicle (RV),
$RV_{Accel}$ is the acceleration rate of the RV.

Though various cars may use sensors and software to improve safety, they are too easily confused by poor weather, unexpected obstacles or circumstances, or complex city driving. By utilizing networking cars together wirelessly and using state data of the cars, the present disclosure provides a predicted state of the cars, detects a collision with a surrounding vehicle in advance, and warns a driver to react in time. The presented method and system performing the method are likely to have a far bigger and more immediate effect on road safety.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
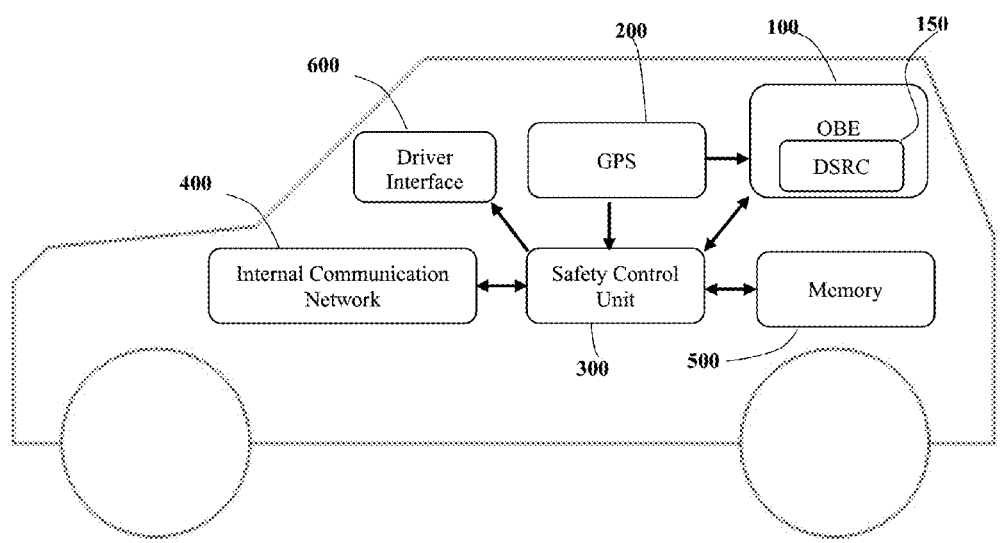
FIG. 1 is a schematic drawing of illustrating a system of warning forward collision according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to enhance the effectiveness of vehicle-based collision countermeasures for rear-end, road-departure and lane change crashes, rear-end and road-departure collision warning systems have been developed. However, the systems have inherent shortcomings that reduce their effectiveness and limit driver acceptance. These shortcomings include misidentification of stopped cars and in-path obstacles for rear-end collision warning systems, as well as map errors and misidentified lane markings for road departure crash warning systems.

Vehicle-to-Vehicle (V2V) wireless communications may enable improved safety system effectiveness by complementing or possibly replacing autonomous safety equipment. The V2V communications provides vehicle information about activities of surrounding vehicles. The V2V communications is enabled by an On-board Unit (OBE) contained a DSRC radio defined by the IEEE 802.11p and IEEE P1609 standards. Vehicles equipped with an OBE will at least provide their GPS information.

We have discovered a forward collision warning as one of the most critical vehicle crash scenarios that need to be addressed, however the disclosed systems and methods may be readily adapted to other collision situations. To give precise warning to a driver in the forward collision situation, the present disclosure provides a method and system to process data from surrounding vehicles (i.e., a remote vehicle) and pair the data with the vehicle's (i.e., a host vehicle) own activities to determine if an imminent crash warning should be provided to the driver. In addition, the present disclosure provides a method of reflecting surrounding weather to improve accuracy of the warning situation.

Referring to FIG. 1, the safety system of a vehicle according to the present disclosure includes: an On-board unit (OBE) 100 which includes a dedicated short range communication (DSRC) radio 150 or other suitable communication device; a global position system (GPS) 200 or other suitable position detection device; and a safety control unit 300. Both a host vehicle and a remote vehicle are preferably equipped with the safety system so that the V2V communication desired for providing vehicle information about activities (e.g., state data) of the surrounding vehicles (e.g., the host vehicle and remote vehicles) is enabled by the OBE 100 contained the DSRC radio 150, although the remote vehicle may only contain equipment for V2V communications.

Every V2V enabled vehicle transmits data defined based on SAE J2735 which defines the structure of the data frame sent over the air. The physical layer of the data structure is based on IEEE 802.11p. A Basic Safety Message (BSM) will be received by the On-board Equipment (OBE) 100 via the DSCR radio 150 according to the SAE J2735 standard.

The BSM may include BSM Part 1 and BSM Part 2. BSM Part 1 includes: message sequence number, vehicle temp ID, time stamp, vehicle position (i.e., latitude, longitude, elevation and accuracy), speed and transmission state, heading, steering angle, acceleration and yaw rate, brake status, vehicle size (i.e., length and width), ABS active, stability control active, longitudinal accelerometer. The BSM Part 2 includes: event flags, exterior lights, throttle position, path history, path prediction and relative positioning RTCM (Radio Technical Commission for Maritime Services) package. The path prediction may contain the predicted radius of curvature for non-straight paths and indication that the path is straight, and the past path history may contain about 20 points of GPS data for GPS delta latitude, longitude, elevation, and UTC time etc. The V2V data BSM is transmitted with short intervals (e.g., every 100 ms) enough to identify vehicles' dynamic events.

The GPS 200 receives position signals of a vehicle (e.g., host or remote vehicles) and provides the vehicle position and time to the DSRC radio 150 and to the safety control unit 300, and the safety control unit 300 also receives information of components of the vehicle via the internal communication network 400. The information of the vehicle may include vehicle speed and position (i.e., latitude, longitude, elevation), transmission state, heading, steering angle, acceleration and yaw rate, brake status, vehicle size (i.e., length and width), ABS active, stability control active, longitudinal accelerometer, and additional information may be added if desired. The vehicle information may be stored in a memory 500, and the memory 500 may store security certificates.

The OBE 100 receives the vehicle information from the safety control unit 300 and other information (e.g., vehicle position and time) from the GPS 200, and transmits the information of the vehicle (e.g., state data of a remote vehicle) to a host vehicle via the DSCR antenna 150 in the BSM format. In one form, the DSCR antenna may be integrated with a GPS antenna. The remote vehicle's state data in the BSM may be transmitted every 100 ms which may be adjusted as desired.

Figure 2A:
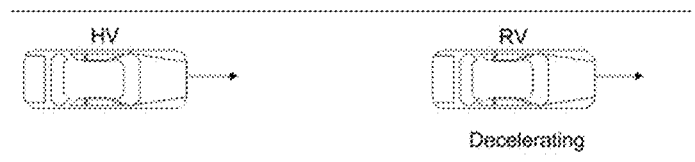
FIGS. 2A-2D are views illustrating examples of situation where a collision of a host vehicle with a remote vehicle may occur.
Figure 2B:
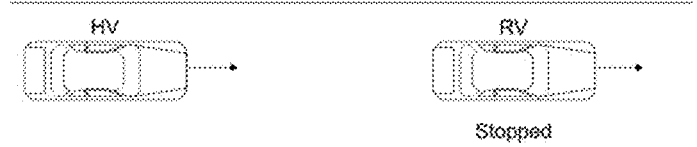
Figure 2C:
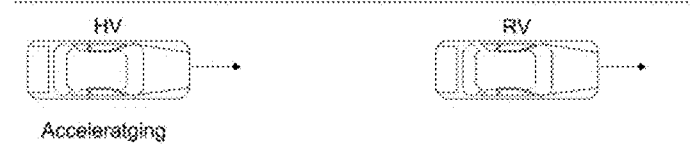
Figure 2D:
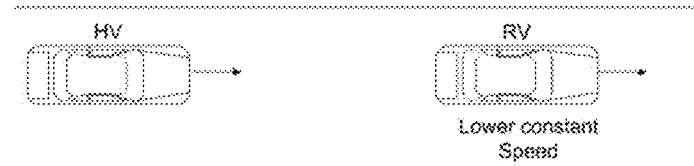

FIGS. 2A-2D describe scenarios where a called forward collision may occur. FIG. 2A illustrates that the remote vehicle (RV) is slowing down and the host vehicle (HV)'s speed is higher than RV's speed; FIG. 2B shows that RV is stopped and HV is approaching with any speed to RV; FIG. 2C describes the situation where HV has higher speed than RV, and HV accelerates or make a lane change to RV's lane; FIG. 2D shows that RV has lower constant speed compared to RV. All of these exemplary scenarios may result in a rear-end collision with the remote vehicle unless other safety measure is taken care of. The method and the system of the present disclosure is capable of detecting the impending rear-end collision with RV under the above scenarios and warning to the driver, or inputting to a controller of HV if desired, to avoid any collision. However the present disclosure is not limited to the exemplary scenarios and instead operable to other various situations to avoid collision with a vehicle.

Figure 3:
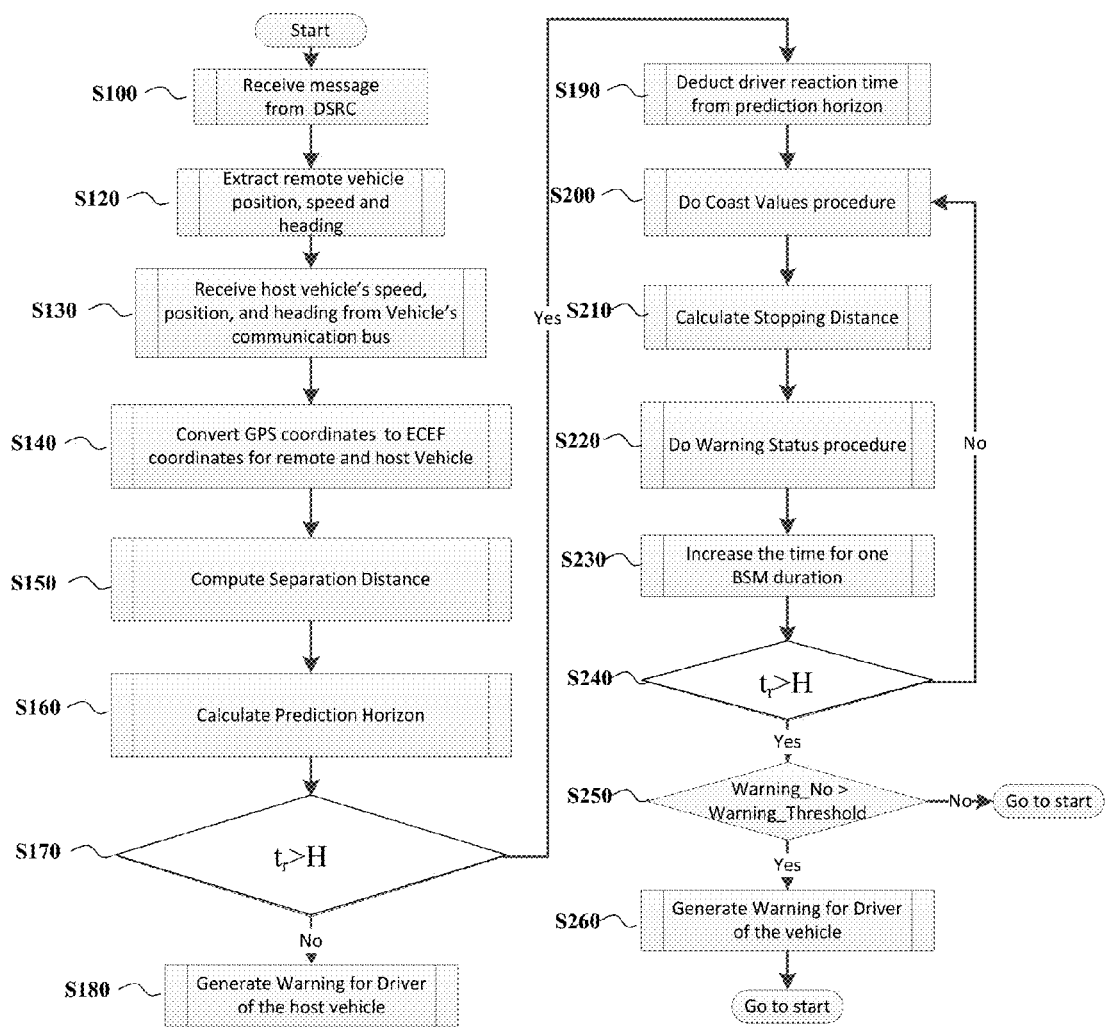
FIG. 3 is a flow chart illustrating the method of detecting a forward collision according to the present disclosure.

FIG. 3 describes in detail how the safety control unit 300 processes the received state data of the remote vehicle and of the host vehicle. The safety control unit 300 of the host vehicle may be implemented as one or more microprocessors operated by a predetermined program. Upon receiving BSM message from the remote vehicle via the DSRC radio 150 (S100), the safety control unit 300 extracts position, speed, acceleration and heading data of the remove vehicle in S120. The safety control unit 30 also receives position, speed, acceleration and heading data of the host vehicle via the internal communication network 400 (e.g., a communication bus) in S130.

In S140, the safety control unit 30 converts the GPS coordinates to ECEF (Earth-Centered, Earth-Fixed) coordinates for the remote and host vehicle's positions such that the safety control unit 30 calculates a separation distance and a prediction horizon based on the ECEF coordinates. In S150, the separation distance "Sep_diss" is calculated as:

$Sep\_diss = \sqrt{\Delta X^2 + \Delta Y^2}$, where $\Delta X = X_{RV} - X_{HV}$, $\Delta Y = Y_{RV} - Y_{HV}$ where, $X_{RV}$, $Y_{RV}$ are converted position coordinates of the remote vehicle;

$X_{HV}$, $Y_{HV}$ are converted position coordinates of the host vehicle.

The computed separation distance between the remote and host vehicles (i.e., Sep_diss) in S150 is used to calculate the prediction horizon "H" by the safety control unit 300 in S160. The prediction horizon "H" is a timestamp aimed to calculate a cost function to be explained below at each sampling instant. The prediction horizon "H" is calculated as:

$$H = \frac{Sep\_diss}{(HV_{Velocity} - RV_{Velocity})},$$

where $HV_{Velocity}$ is a velocity of the host vehicle, $RV_{Velocity}$ is a velocity of the remote vehicle.

The prediction horizon "H" is calculated at each run of the forward collision algorithm as shown in FIG. 3.

In step S170, the safety control unit 300 compares the calculated prediction horizon "H" with a predetermined driver reaction time $t_r$, and send warning signals to a driver interface 600 which generates a warning to the driver of the host vehicle when the prediction horizon time "H" is equal to or less than the predetermined driver reaction time. The warning may be in form of sound, vibration, a visual image, or combination thereof, but it is not limited to these forms.

If the prediction time "H" is greater than the driver reaction time, the safety control unit 300 proceeds to the step S190 in which the driver reaction time $t_r$ is deducted from the prediction horizon time (H). In addition, the safety control unit 300 performs a cost value procedure when the deducted prediction horizon time is greater than zero, the cost value procedure is to cost the position and speed of the host and remote vehicles and to cost the separation distance in step S200 before a stopping distance calculation is performed.

Costing the position and speed of the remote vehicle (RV) is based on a predicted acceleration of the remote vehicle which is calculated by an equation of a called Acceleration Prediction Algorithm which will be described in following. Whereas the safety control unit 300 costs the position and speed of the host vehicle based on a current acceleration of the host vehicle. In addition, the safety control unit 300 costs the separation distance "Sep_diss" based on the predicted acceleration of the remote vehicle and the current acceleration of the host vehicle. The cost values procedure in S210 is repeated for several time instants to prepare the values for new round of calculation in a new time instant so as to reduce an estimation error in the Acceleration Prediction Algorithm.

The available state data of RV in the HV is called past history data of the RV, and the sampling rate of BSM is 10 Hz, that is, the past history (state data) of the RV is updated in every 100 ms. In order to predict an acceleration of the RV, the acceleration of RV is assumed to vary depending on time. The Acceleration Prediction Algorithm is aimed to model the next acceleration value because it recursively represents the signal based on the past history of the signals (i.e., state data in the past). An auto-regressive model is applied to fit on the sample values as follows:

$$RV_{Accel}(t+T)=a_1 RV_{Accel}(t)+a_2 RV_{Accel}(t-T)+ \ldots +a_n RV_{Accel}(t-(n-1)T) \quad \text{equation (1)}$$

where in (1), $RV_{Accel}(t)$ is the acceleration of RV at time t, T is sampling time of BSM and 0.1 s, $a_1, a_2, \ldots, a_n$ are coefficients of linear prediction and n indicates the degree of the model.

To find the best fit on the sample times, two steps should be considered; selecting the model degree (n), and predicting the acceleration for time step ahead based on the coefficients of linear predictions. One method of finding the best coefficients for linear prediction model is least square error method. Noting that any estimation includes estimation error, for time t, equation (1) is rewritten as follows:

$$RV_{Accel}(t)=a_1 RV_{Accel}(t-T)+a_2 RV_{Accel}(t-2T)+ \ldots + a_n RV_{Accel}(t-nT)+e(t) \quad \text{equation (2)}$$

where in (2), e(t) is the estimation error.

A vector representation for equation (2) is given by:

$$RV_{Accel}(t)=\varphi^T(t)\theta+e(t) \quad \text{equation (3)}$$

where, $\varphi$ is the data vector, and $\theta$ is the coefficients vector. The vector $\varphi$ and $\theta$ are given by the Acceleration Prediction Algorithm.

If the past history points are available from t−mT to t in the HV, metrics representation of equation (2) is as follows:

$$RV_{Accel}=\varphi\theta+e \quad \text{equation (4)}$$

$$RV_{Accel} = \begin{bmatrix} RV_{Accel}(t) \\ RV_{Accel}(t-T) \\ \vdots \\ RV_{Accel}(t-mT) \end{bmatrix}, \varphi = \begin{bmatrix} \varphi^T(t) \\ \varphi^T(t-T) \\ \vdots \\ \varphi^T(t-mT) \end{bmatrix}, e = \begin{bmatrix} e(t) \\ e(t-T) \\ \vdots \\ e(t-mT) \end{bmatrix}$$

where, m is the window length. Since Least Square method delivers the best coefficients based on minimizing the energy of the estimation error term, and then the following cost function is minimized in this method:

$$J(\theta) = \frac{1}{2}\sum_{i=0}^{m}(RV_{Accel}(t-iT)-\varphi^T(t-iT)\theta)^2 \quad \text{equation (5)}$$

$$= \frac{1}{2}[RV_{Accel}-\varphi\theta]^T[RV_{Accel}-\varphi\theta]$$

The extremum of the cost function with respect to $\theta$ should satisfy the following condition:

$$\frac{\partial J(\theta)}{\partial \theta} = [RV_{Accel}-\varphi\theta]^T[-\varphi] = 0 \quad \text{equation (6)}$$

Since the second derivative of the cost function is positive, the extremum point of the cost function is a minimum and the coefficients vector, which satisfies the minimum point condition, is given by $$\theta=(\varphi^T\varphi)^{-1}\varphi^T RV_{Accel} \quad \text{equation (7)}$$

In this model of computation, coefficients are not fixed and they are calculated at each BSM moments based on the available past history of RV. We assume that the information of the last 5 history points of RV is always available, therefore the method of estimating the next acceleration of RV in the HV based is given by: $RV_{Accel}(t)=a_1 RV_{Accel}(t-0.1)+a_2 RV_{Accel}(t-0.2)+ \ldots +a_5 RV_{Accel}(t-0.5)$—equation (8), which will be called as the Acceleration Prediction Algorithm in the present disclosure.

In the step S210, the predicted acceleration value calculated by the Acceleration Prediction Algorithm (i.e., equation (8)) is used. After the cost value procedure S200, the safety control unit 300 calculates a stopping distance between the host and remote vehicles based on a configurable deceleration rate of the host vehicle and a friction coefficient of a road surface on which the host vehicle runs.

The configurable deceleration rate of the host vehicle is predetermined based on a brake system of the host vehicle, and the stopping distance is calculated as:

$$d_s = \frac{(HVP_{Velocity})^2}{-2 \times rqd_{decel}} - \frac{(RVP_{Velocity})^2}{-2 \times RV_{Accel}}$$

where: $rqd_{decel}$ is calculated as: $rqd_{decel} = \mu \times rqd_{decel}$,
$HVP_{Velocity}$ is calculated as: $HV_{Velocity} + HV_{Accel} \times t_r$,
$RVP_{Velocity}$ is calculated as: $RV_{Velocity} + RV_{Accel} \times t_r$
where; $d_s$ is the stopping distance,
$\mu$ is the friction coefficient of the road surface,
$rqd_{decel}$ is the configurable deceleration rate of the host vehicle (HV),
$HV_{Velocity}$ is the velocity of the HV,
$HV_{Accel}$ is the acceleration rate of the HV,
$t_r$ is the driver's reaction time,
$RV_{Velocity}$ is the velocity of the remote vehicle (RV),
$RV_{Accel}$ is the acceleration rate of the RV.

Figure 4:
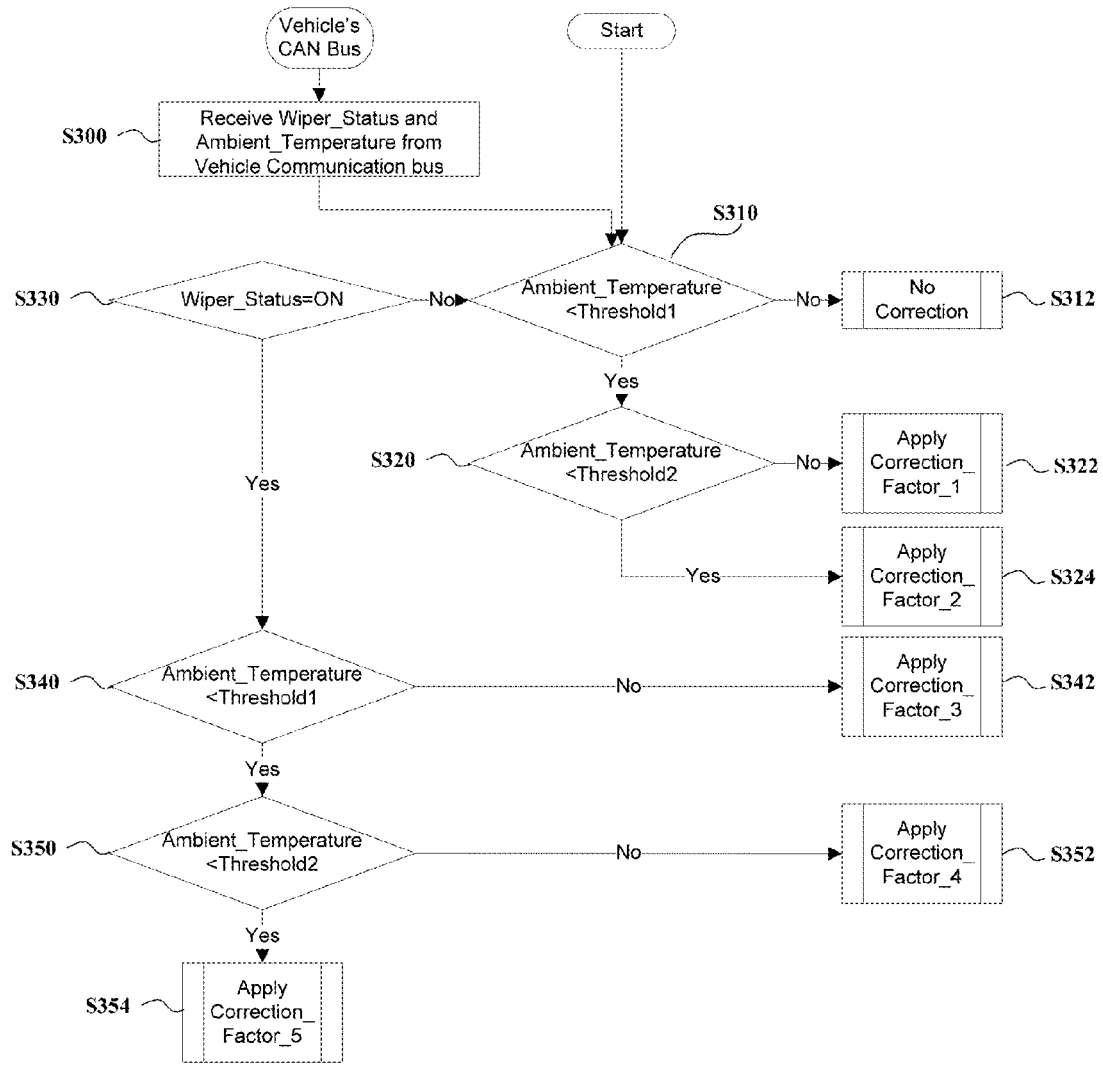
FIG. 4 is a flow chart illustrating the method of estimating a friction coefficient of a road surface.

In addition, the friction coefficient of the road surface is an important factor to estimate the stopping distance, and thus the friction coefficient is calculated by a separate algorithm as described in FIG. 4. In particular, the safety control unit 300 determines a correction factor among predetermined correction factors based on at least one of a wiper status or an ambient temperature of the host vehicle, and applies the determined correction factor to a predetermined friction value so as to set up the friction coefficient of the road surface for the purpose of calculating the stopping distance.

Referring to FIG. 4, the safety control unit 300 receives a wiper status and an ambient temperature of the host vehicle via the internal communication network of the host vehicle (S300), determines whether the ambient temperature is less than a predetermined first threshold value when the wiper status is off (S310), and sets up the predetermined friction value as the friction coefficient of the road surface when the ambient temperature is equal to or greater than the predetermined first threshold value (S312).

If the ambient temperature is less than the predetermined first threshold value, the safety control unit 300 determines whether the ambient temperature is less a predetermined second threshold value (S320), and applies a first correction factor when the ambient temperature is equal to or greater than the predetermined second threshold value (S322) or applies a second correction factor if the ambient temperature is less than the predetermined second threshold value (S324).

If the wiper status is determined as "on" in S330, the safety control unit 300 applies one of third, fourth and fifth correction factors for the friction coefficient of the road surface. In more detail, the safety control unit 300 determines whether the ambient temperature is less a predetermined first threshold value when the wiper status is on (S340), applies a third correction factor when the ambient temperature is equal to or greater than the predetermined first threshold value (S342). If the ambient temperature is less than the predetermined first threshold value and equal to or greater than a predetermined second threshold, a fourth correction factor is applied. In step S354, the safety control unit 300 applies a fifth correction factor when the ambient temperature is less than the predetermined second threshold value.

In the flowchart in FIG. 4, Correction Factor_1 identifies that road may be a little slippery and therefore the time for braking should be increased accordingly. Correction Factor_5 identifies the worst case in terms of the road surface and therefore braking time should be increased the most. The predetermined Correction Factor_1 to Factor_5 (i.e., the first, second, third, fourth and fifth correction factors) depend on vehicle characteristics (e.g. wheel base, size, weight, tire size, type, age etc.). It is also possible to include tire quality as one of the characteristics. A driver can input when the tires are changed in center stack or infotainment system or cluster (similar to the oil quality that is in vehicles today).

In step S220, the safety control unit 300 checks the warning number ("Warning_No"), and increases a warning count when the stopping distance is equal to or greater than the separate distance. For example, a new Warning_No is set by Warning_No+1.

In next step (i.e., S230), the safety control unit 300 increases the time for one BSM duration. As shown in step S240, the driver reaction time ($t_r$) is compared with the prediction horizon "H," and if the driver reaction time is equal to or less than the prediction horizon "H," the safety control unit 300 proceeds the step S200. Otherwise, it proceeds to the step S250.

As illustrated in FIG. 3, when the driver reaction time ($t_r$) is greater than the prediction horizon "H," the safety control unit 300 determines that the number of the warning account (i.e., Warning_No) is greater than a predetermined warning threshold value in the step S250. When the number of the warning account is equal to or less than the predetermined warning threshold value, it proceeds to the Start step. In case where the number of the warning account is greater than the predetermined warning threshold value (i.e., Warning_No>Warning_Threshold), the safety control unit 300 in the step S260 generates a warning signal to the driver interface 600 which in turn may generate a sound, an image on a display, or vibration to the driver of the host vehicle to inform the driver of an impending collision.

The predetermined warning threshold value (i.e., Warning_Threshold) is a configurable parameter based on vehicle's characteristics and the environment. In general, the warning threshold value defines the sensitivity of the system and can range from 1 to 5. For example, 1 makes the system very sensitive and increases the chance of false alerts, and 5 would increase the accuracy as the remote vehicle is detected to be a threat over 5 loops. If 5 is selected then the warning would be delayed by 5 loop times. This threshold provides flexibility in the implementation.

As illustrated above, the present disclosure increases driving safety by avoiding the rear-end crashes and can be implemented in a vehicle with low cost because it does not require various sensors or hardware to detect an impending collision.

What is claimed is:

1. A safety system for an automotive vehicle, comprising:
 a dedicated radio configured to receive and transmit state data between a host vehicle and a remote vehicle;
 a global positioning system (GPS) receiver configured to receive a position of the host vehicle and transmit the location to the radio;
 an on-board unit (OBE) containing the radio and configured to perform a vehicle-to-vehicle (V2V) communications so that the host vehicle receives state data of the remove vehicle in a basic safety message (BSM) format;
 a safety control unit configured to:
   receive the state data of the host and remote vehicles, the state data including a position, a speed and a heading of the host and remote vehicles;
   calculate a separation distance between the host and remote vehicles based on the positions of the remote and host vehicles;

calculate a prediction horizon time based on the separation distance and the speed of the current and remote vehicles;

compare the prediction horizon time with a driver reaction time;

generate a warning to a driver of the host vehicle when the prediction horizon time is equal to or less than the driver reaction time;

deduct the driver reaction time from the prediction horizon time when the prediction time is greater than the driver reaction time;

perform a cost value procedure when the deducted prediction horizon time is greater than zero (0), the cost value procedure configured to determine variable coefficients for estimating a future position and speed of the host and remote vehicles and configured to determine variable coefficients for estimating the separation distance;

after the cost value procedure, calculate a stopping distance between the host and remote vehicles based on a configurable deceleration rate of the host vehicle and a friction coefficient of a road surface on which the host vehicle runs;

increase a warning count when the stopping distance is equal to or greater than the separation distance; and generate a warning to the driver when a number of the warning account is greater than a predetermined warning threshold, wherein the cost value procedure calculates the position and speed of the remote vehicle based on a predicted acceleration of the remote vehicle, and calculates the position and speed of the host vehicle based on a current acceleration of the host vehicle, and wherein the predicted acceleration of the remote vehicle is calculated as:

$$RV_{Accel}(t+T) = a_1 RV_{Accel}(t) + a_2 RV_{Accel}(t-T) + \ldots + a_n RV_{Accel}(t-(n-1)T)$$

where:

$RV_{Accel}(t+T)$ is a predicted acceleration of the remote vehicle (RV) at time t+T, $RV_{Accel}(t)$ is an acceleration of RV at time t, T is a sampling time of the BSM, $a_1, a_2, \ldots, a_n$ are coefficients of linear prediction, and n indicates a degree of the linear prediction model.

2. The system of claim 1, wherein the safety control unit receives the state data of the host vehicle via an internal communication network of the host vehicle.

3. The system of claim 1, wherein the safety control unit calculates the separation distance based on the predicted acceleration of the remote vehicle and the current acceleration of the host vehicle.

4. A method for detecting forward collision of an automotive vehicle including a dedicated short range communication (DSRC) radio equipped with an on-board unit (OBE), the method comprising the steps of:

extracting, by a safety control unit of a host vehicle, a position, a speed and a heading of a remote vehicle from a basic safety message (BSM) received from a remote vehicle via a vehicle-to-vehicle (V2V) communication;

receiving a speed, a position and a heading of the host vehicle via an internal communication network thereof;

calculating, by the safety control unit, a separation distance between the host and remote vehicles based on the positions of the remote and host vehicles;

calculating, by the safety control unit, a prediction horizon time based on the separation distance and the speed of the current and remote vehicles;

comparing, by the safety control unit, the prediction horizon time with a driver reaction time;

generating, by the safety control unit, a warning to a driver of the host vehicle when the prediction horizon time is equal to or less than the driver reaction time;

deducting, by the safety control unit, the driver reaction time from the prediction horizon time when the prediction time is greater than the driver reaction time;

performing, by the safety control unit, a cost value procedure when the deducted prediction horizon time is greater than zero, the cost value procedure configured to calculate a future position and speed of the host and remote vehicles and configured to calculate the separation distance;

after the cost value procedure, calculating, by the safety control unit, a stopping distance between the host and remote vehicles based on a configurable deceleration rate of the host vehicle and a friction coefficient of a road surface on which the host vehicle runs;

increasing, by the safety control unit, a warning count when the stopping distance is equal to or greater than the separation distance; and generating, by the safety control unit, a warning to the driver when a number of the warning account is greater than a predetermined warning threshold, wherein the cost value procedure calculates the position and speed of the remote vehicle based on a predicted acceleration of the remote vehicle, and calculates the position and speed of the host vehicle based on a current acceleration of the host vehicle, and wherein the predicted acceleration of the remote vehicle is calculated as:

$$RV_{Accel}(t+T) = a_1 RV_{Accel}(t) + a_2 RV_{Accel}(t-T) + \ldots + a_n RV_{Accel}(t-(n-1)T)$$

where:

$RV_{Accel}(t+T)$ is a predicted acceleration of the remote vehicle (RV) at time t+T, $RV_{Accel}(t)$ is an acceleration of the RV at time t, T is a sampling time of the BSM, $a_1, a_2, \ldots, a_n$ are coefficients of linear prediction, and n indicates a degree of the linear prediction model.

5. A method for detecting forward collision of an automotive vehicle including a dedicated short range communication (DSRC) radio equipped with an on-board unit (OBE), the method comprising the steps of:

extracting, by a safety control unit of a host vehicle, a position, a speed and a heading of a remote vehicle from a basic safety message (BSM) received from a remote vehicle via a vehicle-to-vehicle (V2V) communication;

receiving a speed, a position and a heading of the host vehicle via an internal communication network thereof;

calculating, by the safety control unit, a separation distance between the host and remote vehicles based on the positions of the remote and host vehicles;

calculating, by the safety control unit, a prediction horizon time based on the separation distance and the speed of the current and remote vehicles;

comparing, by the safety control unit, the prediction horizon time with a driver reaction time;

generating, by the safety control unit, a warning to a driver of the host vehicle when the prediction horizon time is equal to or less than the driver reaction time;

deducting, by the safety control unit, the driver reaction time from the prediction horizon time when the prediction time is greater than the driver reaction time;

performing, by the safety control unit, a cost value procedure when the deducted prediction horizon time is greater than zero, the cost value procedure configured to calculate a future position and speed of the host and remote vehicles and configured to calculate the separation distance;

after the cost value procedure, calculating, by the safety control unit, a stopping distance between the host and remote vehicles based on a configurable deceleration rate of the host vehicle and a friction coefficient of a road surface on which the host vehicle runs; and increasing, by the safety control unit, a warning count when the stopping distance is equal to or greater than the separation distance;

generating, by the safety control unit, a warning to the driver when a number of the warning account is greater than a predetermined warning threshold, wherein the safety control unit determines a correction factor among predetermined correction factors based on at least one of a wiper status or an ambient temperature of the host vehicle, and sets up the friction coefficient of the road surface by correcting a predetermined friction value based on the determined correction factor, wherein the safety control unit determines the correction factor by a method comprising the steps of:

receiving, by the safety control unit, the wiper status and ambient temperature of the host vehicle via the internal communication network thereof;

determining, by the safety control unit, whether the ambient temperature is less than a predetermined first threshold when the wiper status is off;

setting up the predetermined friction value as the friction coefficient of the road surface when the ambient temperature is equal to or greater than the predetermined first threshold;

determining, by the safety control unit, whether the ambient temperature is less a predetermined second threshold when the ambient temperature is less than the predetermined first threshold;

applying, by the safety control unit, a first correction factor when the ambient temperature is equal to or greater than the predetermined second threshold;

applying, by the safety control unit, a second correction factor when the ambient temperature is less than the predetermined second threshold.

6. A method for detecting forward collision of an automotive vehicle including a dedicated short range communication (DSRC) radio equipped with an on-board unit (OBE), the method comprising the steps of:

extracting, by a safety control unit of a host vehicle, a position, a speed and a heading of a remote vehicle from a basic safety message (BSM) received from a remote vehicle via a vehicle-to-vehicle (V2V) communication;

receiving a speed, a position and a heading of the host vehicle via an internal communication network thereof;

calculating, by the safety control unit, a separation distance between the host and remote vehicles based on the positions of the remote and host vehicles;

calculating, by the safety control unit, a prediction horizon time based on the separation distance and the speed of the current and remote vehicles;

comparing, by the safety control unit, the prediction horizon time with a driver reaction time;

generating, by the safety control unit, a warning to a driver of the host vehicle when the prediction horizon time is equal to or less than the driver reaction time;

deducting, by the safety control unit, the driver reaction time from the prediction horizon time when the prediction time is greater than the driver reaction time;

performing, by the safety control unit, a cost value procedure when the deducted prediction horizon time is greater than zero, the cost value procedure configured to calculate a future position and speed of the host and remote vehicles and configured to calculate the separation distance;

after the cost value procedure, calculating, by the safety control unit, a stopping distance between the host and remote vehicles based on a configurable deceleration rate of the host vehicle and a friction coefficient of a road surface on which the host vehicle runs; and increasing, by the safety control unit, a warning count when the stopping distance is equal to or greater than the separation distance;

generating, by the safety control unit, a warning to the driver when a number of the warning account is greater than a predetermined warning threshold, wherein the safety control unit determines a correction factor among predetermined correction factors based on at least one of a wiper status or an ambient temperature of the host vehicle, and sets up the friction coefficient of the road surface by correcting a predetermined friction value based on the determined correction factor, wherein the safety control unit determines the correction factor by a method comprising the steps of:

determining, by the safety control unit, whether the wiper status is on;

determining, by the safety control unit, whether the ambient temperature is less a predetermined first threshold when the wiper status is on;

applying, by the safety control unit, a third correction factor when the ambient temperature is equal to or greater than the predetermined first threshold;

applying, by the safety control unit, a fourth correction factor when the ambient temperature is less than the predetermined first threshold and equal to or greater than a predetermined second threshold;

applying, by the safety control unit, a fifth correction factor when the ambient temperature is less than the predetermined second threshold.

7. The method of claim 6, wherein the configurable deceleration rate of the host vehicle is predetermined based on a brake system of the host vehicle, and the stopping distance is calculated as:

$$d_s = \frac{(HVP_{Velocity})^2}{-2 \times rqd_{decel}} - \frac{(RVP_{Velocity})^2}{-2 \times RV_{Accel}}$$

where: $rqd_{decel}$ is calculated as: $rqd_{decel} = \mu \times rqd_{decel}$,
$HVP_{Velocity}$ is calculated as: $HV_{Velocity} + HV_{Accel} \times t_r$,
$RVP_{Velocity}$ is calculated as: $RV_{Velocity} + RV_{Accel} \times t_r$
where; $d_s$ is the stopping distance,
$\mu$ is the friction coefficient of the road surface,
$rqd_{decel}$ is the configurable deceleration rate of the host vehicle (HV), $HV_{Velocity}$ is the velocity of the HV,
$HV_{Accel}$ is the acceleration rate of the HV,
$t_r$ is the driver's reaction time,
$RV_{Velocity}$ is the velocity of the remote vehicle (RV),
$RV_{Accel}$ is the acceleration rate of the RV.

\* \* \* \* \*